United States Patent [19]

Banerjee et al.

[11] Patent Number: 5,147,830
[45] Date of Patent: Sep. 15, 1992

[54] COMPOSITION AND METHOD FOR MANUFACTURING STEEL-CONTAINMENT EQUIPMENT

[75] Inventors: Subrata Banerjee, Glen Ellyn; Charles W. Connors, Jr., Chicago, both of Ill.

[73] Assignee: Magneco/Metrel, Inc., Addison, Ill.

[21] Appl. No.: 798,347

[22] Filed: Nov. 21, 1991

Related U.S. Application Data

[63] Continuation of Ser. No. 527,033, May 21, 1990, abandoned, which is a continuation-in-part of Ser. No. 424,950, Oct. 23, 1989, abandoned.

[51] Int. Cl.⁵ .................... C04B 35/52; C04B 35/56
[52] U.S. Cl. ........................... 501/89; 501/128; 501/130; 501/141; 501/153; 106/38.3
[58] Field of Search ............... 501/89, 85, 153, 154, 501/141, 144; 106/692, 38.3, 731

[56] References Cited

U.S. PATENT DOCUMENTS

| | | | |
|---|---|---|---|
| 3,041,205 | 6/1962 | Iler | 117/129 |
| 3,067,050 | 12/1962 | Miller, Jr. | 106/65 |
| 3,230,100 | 1/1966 | Davies et al. | 106/44 |
| 3,353,975 | 11/1967 | Shannon | 106/65 |
| 3,432,312 | 3/1969 | Feagin et al. | 106/38.3 |
| 3,652,307 | 3/1972 | Bakker | 106/65 |
| 3,860,476 | 1/1975 | Moore, Jr. | 156/297 |
| 3,892,584 | 7/1975 | Takeda et al. | 106/56 |
| 3,920,578 | 11/1975 | Yates | 252/313 S |
| 4,018,615 | 4/1977 | Mills | 106/69 |
| 4,041,199 | 8/1977 | Cartwright | 428/36 |
| 4,056,399 | 11/1977 | Kirkpatrick et al. | 106/69 |
| 4,061,501 | 12/1977 | Ivarsson et al. | 106/44 |
| 4,069,057 | 1/1978 | Kamei et al. | 106/55 |
| 4,128,431 | 12/1978 | Svec | 106/38.35 |
| 4,139,393 | 2/1979 | Chadhok | 106/38.3 |
| 4,218,254 | 8/1980 | Kiehl et al. | 106/44 |
| 4,226,625 | 10/1980 | Delcorio et al. | 106/38.22 |
| 4,245,761 | 1/1981 | Hazlehurst et al. | 222/590 |
| 4,331,773 | 5/1982 | Hongo et al. | 501/128 |
| 4,342,597 | 8/1982 | Brown | 106/38.27 |
| 4,476,234 | 10/1984 | Jones et al. | 501/89 |
| 4,605,057 | 8/1986 | Sakai et al. | 164/519 |
| 4,709,741 | 12/1987 | Nakamura | 164/35 |
| 4,715,895 | 12/1987 | Schnippering et al. | 106/38.3 |
| 4,751,204 | 6/1988 | Koyden et al. | 501/89 |
| 4,780,142 | 10/1988 | Rechter | 106/84 |
| 4,800,181 | 1/1989 | Lassiter et al. | 501/89 |
| 4,916,092 | 4/1990 | Tiegs et al. | 501/89 |

FOREIGN PATENT DOCUMENTS

| | | |
|---|---|---|
| 1471213 | 5/1969 | Fed. Rep. of Germany . |
| 2190759 | 2/1974 | France . |
| 2228742 | 12/1974 | France . |
| 2247433 | 5/1975 | France . |
| 8017506 | 7/1971 | Japan . |
| 065558 | 8/1971 | Japan . |
| 1101455 | 10/1984 | Japan . |
| 1158872 | 12/1984 | Japan . |

OTHER PUBLICATIONS

Norton "Refractories" McGraw-Hill N.Y. 1949, p. 112.
Chemical Abstracts, vol. 101, No. 24, Dec. 10, 1984, p. 246, Abstract No. 215371M, Ishibashi et al.

*Primary Examiner*—William R. Dixon, Jr.
*Assistant Examiner*—Alan Wright
*Attorney, Agent, or Firm*—Willian Brinks Olds Hofer Gilson & Lione

[57] ABSTRACT

An improved casting composition utilizes an aqueous finely dispersed silica binder to provide reduced drying times and reduced cracking and explosion of troughs, runners and other containment equipment designed for use by the iron and steel industry. The composition is prepared by mixing 8-14% by weight of the aqueous silica binder with 55-90% by weight of a refractory base material and up to 35% by weight of silicon carbide. Preferably, the composition will also include 5-10% by weight of calcined alumina, 1-10% by weight of microsilica, and 0.02-1% by weight of a setting agent. Troughs and runners manufactured from the composition also exhibit increased strength and improved resistance to oxidation, corrosion and erosion.

19 Claims, No Drawings

COMPOSITION AND METHOD FOR MANUFACTURING STEEL-CONTAINMENT EQUIPMENT

RELATED APPLICATIONS

This application is a continuation of application Ser. No. 07/527,033, filed May 21, 1990, now abandoned; which in turn is a continuation in part of application Ser. No. 07/424,950, filed Oct. 23, 1989, now abandoned.

BACKGROUND AND SUMMARY OF THE INVENTION

This invention relates to a casting composition for use in the construction of troughs, runners, ladles and other vessels which are used for containing and processing molten iron and steel. When compared with known casting compositions, the composition of the invention requires much less drying time and is less prone to cracking or explosion during drying.

The composition of the invention can be prepared by mixing 55-90% by weight of a refractory base material, such as calcined clay, mullite, brown fused alumina or tabular alumina, with up to 35% by weight of silicon carbide and 8-14% by weight of a binder material which includes very fine (preferably colloidal) silica particles dispersed in water.

Brown fused alumina is a term of art which refers to a dark brown, glassy looking material including approximately 93-98% by weight alumina, and smaller amounts of titania, silica and iron. Tabular alumina is a term of art which refers to a white, opaque material including approximately 98.5-99.9% by weight alumina and smaller amounts of sodium oxide, silica, magnesium oxide and calcium oxide. Calcined clay is a term of art which refers to a composition having approximately 43-48% by weight alumina, 47-50% by weight silica, and smaller amounts of titania, iron and sodium oxide. Mullite is a term of art which refers to a composition containing approximately 57-73% by weight alumina, 27-40% by weight silica, and smaller amounts of impurities.

Preferably, the composition will also include between 0.02-1% by weight of a setting agent such as magnesium oxide or calcium aluminate cement, 5-20% by weight of calcined alumina, and 1-10% by weight of microsilica. Calcined alumina is a term of art which refers to a composition containing approximately 99.6% by weight of alumina and trace amounts of sodium oxide and silica. The primary difference between calcined alumina and tabular alumina is that calcined alumina has a lower firing temperature (about 2600°-2700° F.) than tabular alumina (about 3400° F.). As a result, calcined alumina is finer and more reactive than tabular alumina.

Between 2-10% by weight of a graphite material may optionally be included as a nonwetting agent and to inhibit the chemical reaction between "slag" (present in molten steel) and the refractory base material.

The use of a colloidal silica binder represents an improvement over known casting compositions which utilize calcium aluminate cement and/or clay. Calcium aluminate cement and clay chemically bind to water. Therefore, troughs and runners produced from compositions which include these binder materials are relatively difficult to dry, requiring between 30-80 hours of drying time at temperatures of up to 1500° F., depending upon the thickness of the structure. Furthermore, the structures may crack or even explode during drying at temperatures above 250° F. Complete removal of residual water is an essential step in the production of troughs and runners, partly to prevent cracking and explosion during use when the structures are exposed to molten iron and steel.

Troughs and runners produced from casting compositions which utilize colloidal silica binders require much less drying time because the silica does not become chemically attached to residual water. Typically, these structures become set after 15 minutes-5 hours at room temperature, followed by 5-30 hours during which time the structure is heated to the desired temperature (i.e., above 250° F.) and completely dried. The amount of setting time required depends on the thickness of the structure. Furthermore, the risks of cracking and/or explosion are substantially eliminated when a colloidal silica binder is used. The colloidal silica binder also imparts several other advantages to the trough or runner including increased strength and improved resistance to oxidation, corrosion and erosion.

An additional advantage of the casting composition of the invention is that it has improved flow characteristics which allow it to be transported to the casting mold using a standard concrete pump. This constitutes a major advantage over casting compositions of the prior art which, due to relatively poor flow characteristics, had to be transported to the mold using a hopper and crane. By using a concrete pump of a type well known for transporting cement, the amount of time required to transport the casting composition and fill the mold in a typical application can be reduced from between 6-8 minutes to about 30 seconds.

DESCRIPTION OF THE PREFERRED EMBODIMENTS

The casting composition of the invention includes, as a major component, a refractory base material in an amount of between 55-90% by weight. The refractory base material preferably has an average particle diameter of between 30 micrometers and 7 millimeters and preferably is composed of calcined clay, mullite, brown fused alumina, tabular alumina or mixtures thereof. When calcined clay or mullite is utilized, the amount is preferably between 60-75% by weight. When brown fused alumina is used, the amount is preferably between 65-80% by weight. For tabular alumina, the amount is preferably between 70-90% by weight.

In addition to the refractory material, the casting composition preferably includes silicon carbide in an amount of between 1-35% by weight, and more preferably in an amount of between 5-25% by weight. The silicon carbide preferably has an average diameter of between 30 micrometers and 1.5 millimeters. The silicon carbide reduces physical erosion of troughs and runners constructed using the casting composition of the invention and helps prevent the base material from reacting chemically with the slag.

The casting composition may optionally include 2-10% by weight of graphite which ultimately acts as a nonwetting agent to prevent attachment to or penetration of the base material by slag. The purpose of the graphite is to further inhibit chemical reaction between slag and base material. The graphite may be amorphous or crystalline or in the form of flakes.

The casting composition of the invention includes a silica binder which is formed from finely dispersed (preferably colloidal) silica particles in an aqueous medium. Silica having an average diameter of preferably between 4–100 millimicrons, and most preferably 8–20 millimicrons, is initially dispersed in water in an amount of between 15–70% by weight, preferably about 40% by weight. The resulting colloidal silica binder is then mixed with the other components of the casting composition in an amount of between 8–14% based on the weight of the resulting composition.

The casting composition preferably includes between 0.02–1% of a setting agent. Examples of suitable setting agents are calcium aluminate cement and magnesium oxide. Finally, the casting composition preferably includes between 5–20% by weight of calcined alumina and between 1–10% by weight of microsilica.

The calcined alumina reacts with the silica binder to form a sediment phase which causes improved binding characteristics, particularly at higher temperatures. The calcined alumina preferably has an average diameter of 0.2–70 microns. The microsilica improves the initial flow characteristics of the casting composition. The microsilica preferably has an average diameter of 0.1–1.0 microns, and most preferably between 0.15–0.25 microns.

When manufacturing containment equipment from the composition of the invention, the dry components are initially mixed together. Then, the aqueous silica dispersion is added to the dry blend and the resulting damp mixture is transported to the mold using a concrete pump and formed into the ultimate shape of the trough, runner or other containment structure. The containment structure is dried at room temperature for 15 minutes to 5 hours, and then at higher temperature (i.e., above 250° F.) for 5–30 hours. The drying times may vary considerably depending on the wall thicknesses of the containment structure.

An example of a concrete pump which is suitable for use with the casting composition of the invention is the Thom-Kat TVS16-2065, available from Pultzmeister, Inc., Thomsen Division, Gardena, Calif. 90248. Such a concrete pump is described in U.S. Pat. No. 3,832,097, and in German Patent No. 2,162,406, the entire disclosures of which are incorporated herein by reference. While such concrete pumps have long been useful for transporting cement, it was not previously possible to use concrete pumps to transport casting compositions of the types used in the iron and steel industry. Other commercially available concrete pumps can also be used to transport the casting composition of the invention.

While the embodiments of the invention disclosed herein are presently considered to be preferred, it is understood that various modifications and improvements can be made without departing from the spirit and scope of the invention. The scope of the invention is indicated in the appended claims, and all changes which come within the meaning and range of equivalency of the claims are intended to be embraced therein.

EXAMPLE I

A casting composition was prepared by mixing the following components together in the stated weight percentages:

a) 25% brown fused alumina having an average particle diameter of 4 millimeters;
b) 20% brown fused alumina having an average particle diameter of 1 millimeter;
c) 15% brown fused alumina having an average particle diameter of 200 microns;
d) 15% silicon carbide having an average particle diameter of 100 microns;
e) 5% calcined alumina having an average particle diameter of 50 microns;
f) 5% graphite having an average particle diameter of 100 microns;
g) 0.2% magnesia having an average particle diameter of 100 microns;
h) 5% microsilica having an average diameter of 0.2 microns; and
i) 10% silica binder consisting of 40% by weight colloidal silica having an average diameter of 20 millimicrons, dispersed in an aqueous medium.

The resulting casting composition yielded structures which had reduced drying times, reduced cracking and explosion, increased strength, and improved resistance to oxidation, corrosion and erosion.

EXAMPLE II

A casting composition was prepared by mixing the following components together in the stated weight percentages:

a) 25% mullite having an average diameter of 2 millimeters;
b) 15% mullite having an average diameter of 800 microns;
c) 20% mullite having an average diameter of 200 microns;
d) 13% silicon carbide having an average diameter of 100 microns;
e) 5% calcined alumina having an average diameter of 100 microns;
f) 5% graphite having an average diameter of 100 microns;
g) 0.2% magnesia having an average diameter of 100 microns;
h) 5% microsilica having an average diameter of 0.15 microns; and
i) 12% silica binder consisting of 40% by weight colloidal silica having an average diameter of 20 millimicrons, dispersed in an aqueous medium.

The resulting casting composition yielded structures which had reduced drying times, reduced cracking and explosion, increased strength, and improved resistance to oxidation, corrosion and erosion.

I claim:

1. A method for manufacturing steel containment equipment, comprising the steps of:

forming a pumpable casting composition by mixing a compound comprising 55–90% by weight of a granular base material selected from the group consisting of calcined clay, mullite, brown fused alumina, tabular alumina and mixtures thereof, 5–20% by weight of calcined alumina, and 8–14% by weight of a silica binder formed from a dispersion of 15–70% by weight colloidal silica in water, the colloidal silica having an average particle diameter of 4–100 millimicrons;

transporting the casting composition to a mold assembly using a concrete pump; and molding the casting composition to form a steel containment device.

2. The method of claim 1, wherein the granular base material comprises calcined clay having an average diameter of between 30 micrometers and 7 millimeters.

3. The method of claim 2, wherein the calcined clay is present in an amount of between 65-70% by weight.

4. The method of claim 1, wherein the granular base material comprises mullite having an average diameter of between 30 micrometers and 7 millimeters.

5. The method of claim 4, wherein the mullite is present in an amount of between 60-75% by weight.

6. The method of claim 1, wherein the granular base material comprises brown fused alumina having an average diameter of between 30 micrometers and 7 millimeters.

7. The method of claim 6, wherein the brown fused alumina is present in an amount of between 65-80% by weight.

8. The method of claim 1, wherein the granular base material comprises tabular alumina having an average diameter of between 30 micrometers and 7 millimeters.

9. The method of claim 8, wherein the tabular alumina is present in an amount of between 70-90% by weight.

10. A steel containment device manufactured according to the method of claim 1.

11. A method for manufacturing steel containment equipment, comprising the steps of:
   forming a pumpable casting composition by mixing a composition comprising 55-90% by weight of a granular base material selected from the group consisting of calcined clay, mullite, brown fused alumina, tabular alumina and mixtures thereof, 5-20% by weight silicon carbide, and 8-14% by weight of a silica binder formed from a dispersion of 15-70% by weight colloidal silica in water;
   transporting the casting composition to a mold assembly using a concrete pump; and
   molding the casting composition to form a steel containment device.

12. The method of claim 11, wherein the silicon carbide has an average diameter of between 30 micrometers and 1.5 millimeters.

13. The method of claim 11, wherein the colloidal silica has an average diameter of between 4-100 millimicrons.

14. The method of claim 11, wherein the colloidal silica has an average diameter of between 8-20 millimicrons.

15. The method of claim 11, wherein the pumpable casting composition further includes 2-10% by weight graphite.

16. A steel containment device manufactured according to the method of claim 11.

17. A casting composition for use in the construction of troughs and runners for the iron and steel industry, comprising:
   55-85% by weight of a granular base material selected from the group consisting of calcined clay, mullite, brown fused alumina, tabular alumina, and mixtures thereof;
   5-25% by weight silicon carbide; and
   8-14% by weight of a binder formed from a dispersion of 15-70% by weight silica in water, the silica consisting essentially of colloidal silica having an average particle diameter of between 4-100 millimicrons;
   mixed together to form a damp, pumpable mixture.

18. The casting composition of claim 17, further comprising 2-10% by weight graphite.

19. The casting composition of claim 17, further comprising 0.02-1% by weight of a setting agent selected from the group consisting of magnesium oxide, calcium aluminate cement and mixtures thereof.

* * * * *

UNITED STATES PATENT AND TRADEMARK OFFICE
CERTIFICATE OF CORRECTION

PATENT NO. : 5,147,830
DATED : September 15, 1992
INVENTOR(S) : Subrata Banerjee It is certified that error appears in the above-indentified patent and that said Letters Patent is hereby corrected as shown below:

Column 5,

In Claim 11, line 7, after the second occurrence of "alumina" insert --,--.

In Claim 11, line 8, delete "20%" and substitute --25%--.

Signed and Sealed this

Nineteenth Day of September, 1995

Attest:

BRUCE LEHMAN

Attesting Officer                Commissioner of Patents and Trademarks